(No Model.)

E. H. RUST.
JOURNAL BOX.

No. 297,016. Patented Apr. 15, 1884.

Witnesses.
John F. C. Preinkert
Bernice J. Noyes.

Inventor
Ephraim H. Rust
by Crosby & Gregory
Atty's.

UNITED STATES PATENT OFFICE.

EPHRAIM H. RUST, OF BOSTON, MASSACHUSETTS.

JOURNAL-BOX.

SPECIFICATION forming part of Letters Patent No. 297,016, dated April 15, 1884.

Application filed March 4, 1882. (No model.)

*To all whom it may concern:*

Be it known that I, EPHRAIM H. RUST, of Boston, county of Suffolk, State of Massachusetts, have invented an Improvement in Compressed-Asbestus Bearings, of which the following description, in connection with the accompanying drawings, is a specification.

The object of my invention is to produce a bearing for journals or arbors which shall be durable and attended with very little wear, both in the journal and the bearing itself.

The invention consists in a combination of the journal box or frame and the packing therein, composed of a substantially homogeneous admixture of asbestus and silicate of soda or equivalent substance, as hereinafter specified and claimed.

In the manufacture of my bearings, lining, or packing, the asbestus is preferably first disintegrated or picked to pieces by a suitable machine, and then cleaned, after which sufficient silicate of soda is added to make a pulp, which is subjected to great pressure in dies or otherwise, under which it becomes a hard, compact, and homogeneous mass suitable for the purposes of my invention. The silicate of soda renders the mass cohesive and durable.

Figure 1:
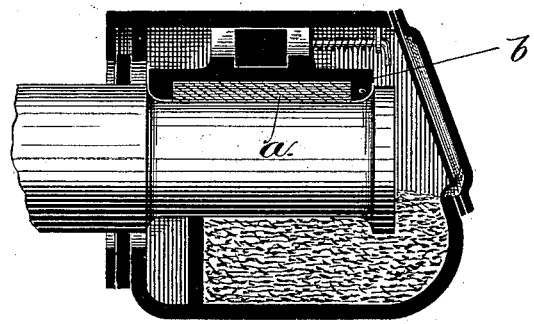
Figure 2:
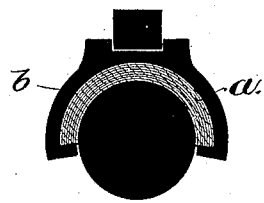

The drawings show a car-axle box the bearing portion or brass of which is made in accordance with my invention, Figure 1 being a longitudinal section with the axle-journal in elevation, and Fig. 2 a cross-section of the journal bearing or brass and its box or frame.

The bearing portion $a$ may be of substantially the shape of the usual brasses of a bearing-box, it being composed of asbestus picked to pieces, cleansed, and mixed with silicate of soda or equivalent substance, and preferably formed into a pulp, which, being placed in the proper receptacle, is subjected to great pressure, reducing it to a compact homogeneous mass. $b$ is the frame or box in which the bearing or brass is placed, this and the other parts of the box being of any approved form. The nib or journal only of the axle is shown.

I do not herein claim a bearing for journals composed of a frame or box and a packing of asbestus and silicate of soda, the same being the invention of the patentee named in United States Letters Patent No. 280,978.

What I claim is—

The combination of the journal box or frame and the packing therein, composed of a substantially homogeneous admixture of asbestus and silicate of soda or equivalent substance, substantially as set forth.

In testimony whereof I have signed my name to this specification in the presence of two subscribing witnesses.

EPHRAIM H. RUST.

Witnesses:
 JOS. P. LIVERMORE,
 W. H. SIGSTON.